United States Patent [19]

Eftestol

[11] Patent Number: 4,789,116

[45] Date of Patent: Dec. 6, 1988

[54] LANDING DECK FOR AIRCRAFT

[75] Inventor: Bard Eftestol, Raufoss, Norway

[73] Assignee: A/S Raufoss Ammunisjonsfabrikker, Raufoss, Norway

[21] Appl. No.: 98,700

[22] PCT Filed: Jun. 27, 1985

[86] PCT No.: PCT/NO85/00041

§ 371 Date: Feb. 18, 1986

§ 102(e) Date: Feb. 18, 1986

[87] PCT Pub. No.: WO86/00274

PCT Pub. Date: Jan. 16, 1986

Related U.S. Application Data

[63] Continuation-in-part of Ser. No. 835,117, Feb. 18, 1986, abandoned.

[30] Foreign Application Priority Data

Jun. 27, 1984 [NO] Norway ................................ 842595

[51] Int. Cl.⁴ ................................................ B64F 1/00

[52] U.S. Cl. .................................... 244/114 R; 52/11; 52/14; 404/2

[58] Field of Search ............. 244/114 R; 114/85, 197, 114/198; 404/2, 3; 405/119; 52/11-15

[56] References Cited

U.S. PATENT DOCUMENTS

| | | | |
|---|---|---|---|
| 469,044 | 2/1892 | JungBluth | 404/2 |
| 687,106 | 11/1901 | Anderson | 404/3 |
| 2,923,504 | 2/1960 | Ortega et al. | 244/114 R |
| 3,307,302 | 3/1967 | Gutierrez | 52/11 |
| 3,417,519 | 12/1968 | Hitter | 52/11 |
| 3,645,177 | 2/1972 | Hargett | 404/2 |
| 4,065,883 | 1/1978 | Thibodeau | 52/11 |
| 4,181,179 | 1/1980 | Batte | 244/114 R |
| 4,474,130 | 10/1984 | Birkeland | 244/114 R |
| 4,560,302 | 12/1985 | Karbstein | 404/2 |

FOREIGN PATENT DOCUMENTS

| | | | |
|---|---|---|---|
| 2023271 | 7/1971 | Fed. Rep. of Germany | 52/14 |
| 3243210 | 8/1983 | Fed. Rep. of Germany | 404/2 |
| 576484 | 5/1958 | Italy | 52/14 |
| 0574511 | 9/1977 | U.S.S.R. | 52/14 |
| 1344236 | 1/1974 | United Kingdom | 404/2 |

*Primary Examiner*—Galen Barefoot
*Assistant Examiner*—Lynn M. Fiorito
*Attorney, Agent, or Firm*—Watson, Cole, Grindle & Watson

[57] ABSTRACT

Landing deck for aircraft, in particular for helicopters, on seagoing vessels and offshore installations, such as platforms. When fuel is leaking from a helicopter after an accident, as for instance an unsuccessful landing, a fire often starts. In order to reduce the combustion intensity and the duration of such a fire continuous grooves or channels (8) are formed in beams of steel or metal, of which the deck is made, in the surface facing upwardly. Thereby fuel which has leaked out will be collected in the grooves or channels. The air supply to the grooves or channels is poorer than the air supply to fuel situated on decks without grooves or channels, and the combustion intensity, therefore, is reduced. Moreover, the combustion takes place on the surface of the liquid, and it is possible to drain a substantial part of the fuel without ignition thereof. Fuel may be collected from the grooves or channels by means of a collecting manifold or gutter.

8 Claims, 2 Drawing Sheets

LANDING DECK FOR AIRCRAFT

This application is a continuation-in-part, of application Ser. No. 835,117, filed Feb. 28, 1986, now abandoned.

BACKGROUND OF THE INVENTION

1. Field of the Invention

The present invention relates to a landing deck for aircraft, and in particular, but not exclusively, to a helicopter deck of the type used on seagoing vessels and installations, such as offshore platforms.

2. The Prior Art

It is desirable to protect such decks against fire. There is always a danger of accidents and damage, to a larger extent than on airfields, because of adverse weather conditions and because the deck follows the movements of the vessel or platform. In an accident fuel from a helicopter may leak out and to be spread along the deck, and the fuel may be set on fire. The ignition may lead to a serious fire, and the combustion intensity may be very high when the fuel is spread out on a relatively smooth surface, because the fuel presents a large surface to the air. It is of course desirable to limit and to stop such a fire as soon as possible, and it is known to provide systems adapted to coat the deck with foam in order to stop the fire. It is of course also known to place extinguishing equipment, such as foam extinguishers, on or near the decks, and, moreover, it is known to provide channels in the runways of airfields, for spraying of foam. In Norwegian Acceptance Print No. 139.526 is described means adapted to coat a helicopter deck with foam in order to stop a fire, whereby a framework is placed above a planar deck and a lattice work above the framework. In the cavities thereby formed below the lattice work are provided apertures for spraying of foam. The purpose of this is among else to prevent that the foam being sprayed is blown away without giving any fire-extinguishing effect.

Thus, the known systems first of all concern means for extinguishing a fuel fire which has been spread along a deck.

SUMMARY OF THE INVENTION

The object of the present invention is to provide means leading to a reduced intensity and duration of a possible fire on a deck, such means being "passive" means included in the deck, i.e., means which without any action are operative in case of a fire, without the need of starting the operation of an extinguishing system. The invention is, however, not restricted to the use of such means separately, and "active" means, such as a foam spraying system, may be used additionally.

The invention is among else based upon the fact that the combustion intensity by the combustion of a certain amount of combustible liquid usually increases with the size of the free surface of the liquid, and that the intensity is not influenced by the depth of the liquid below the free surface. Thus, it is in the principle possible to restrict the intensity of the combustion by restricting the free surface.

Moreover, the combustion intensity of a liquid in a container which is open at the top will depend on the ratio between the size of the upper aperture of the container and the distance from the aperture to the liquid surface. When the container aperture is sufficiently small relatively to this distance, combustion on the liquid surface will extinguish by itself after a short time. In containers having equally large upper apertures, the combustion intensity will decrease with increasing distance to the liquid surface.

A main idea on which the invention is based is to take advantage of these facts by providing grooves in at least some of the beams of the deck in order to reduce the combustion intensity. Another main idea is to drain the liquid rapidly from the deck during a fire in order to reduce the amount of liquid set on fire.

Thus, when combustible liquid, such as helicopter fuel, is spread on a deck constructed in accordance with the present invention and set on fire, the liquid will very rapidly flow down into the grooves. Only portions of the beams remaining between the grooves will be wetted by liquid, and this liquid will either burn or vaporize. Most of the liquid will flow down into the grooves. There, the liquid may burn, but with a much lower intensity than when burning on a planar deck surface without grooves. Moreover, the liquid in the grooves is protected against the radiation heat from liquid burning on the deck surface, and it is possible to achieve drainage of most of the liquid from the deck without being set to fire. For the purpose of the drainage the deck may have an inclination, and collecting gutters or manifolds may be provided in order to collect liquid from all the grooves and to direct it away from the deck.

When a deck in accordance with the invention is constructed of extruded beams of aluminium or an aluminium alloy the grooves may of course be formed during the extrusion. The same applies to steel beams. For beams formed in another manner, for instance by rolling, the grooves may also be formed by the manufacture of the beams. To the extent it is warrantable with respect to strength and stability, grooves may also be formed in existing decks, e.g., by milling or by sawing through the beams and subsequently mounting of gutters on the underside of the beams below the sawn slits.

The grooves may be undercut, i.e., have an upper opening which is narrow relatively to the space below the opening. Thereby the supply of air to the grooves will be choked and simultaneously the volumetric capacity of the grooves will be large.

When the invention is used on floating installations which may move in such a manner that the inclination of the deck is changed, the deck should be inclined in the direction of the grooves, from the middle towards each end, or from each end towards the middle, in order to ensure that drainage of the liquid is achieved. Inclination merely in one direction towards a manifold brings about the risk that the inclination may be "negative" because the installation takes an opposite inclination.

In order to further increase the effect of the invention the surface of the beams may be inclined in the transverse direction, towards the grooves, so that the liquid flows rapidly down into the grooves.

The invention will hereinafter be explained by means of the accompanying drawings, taken in conjunction with the following discussion.

DETAILED DESCRIPTION OF THE PREFERRED EMBODIMENT

Figure 1:
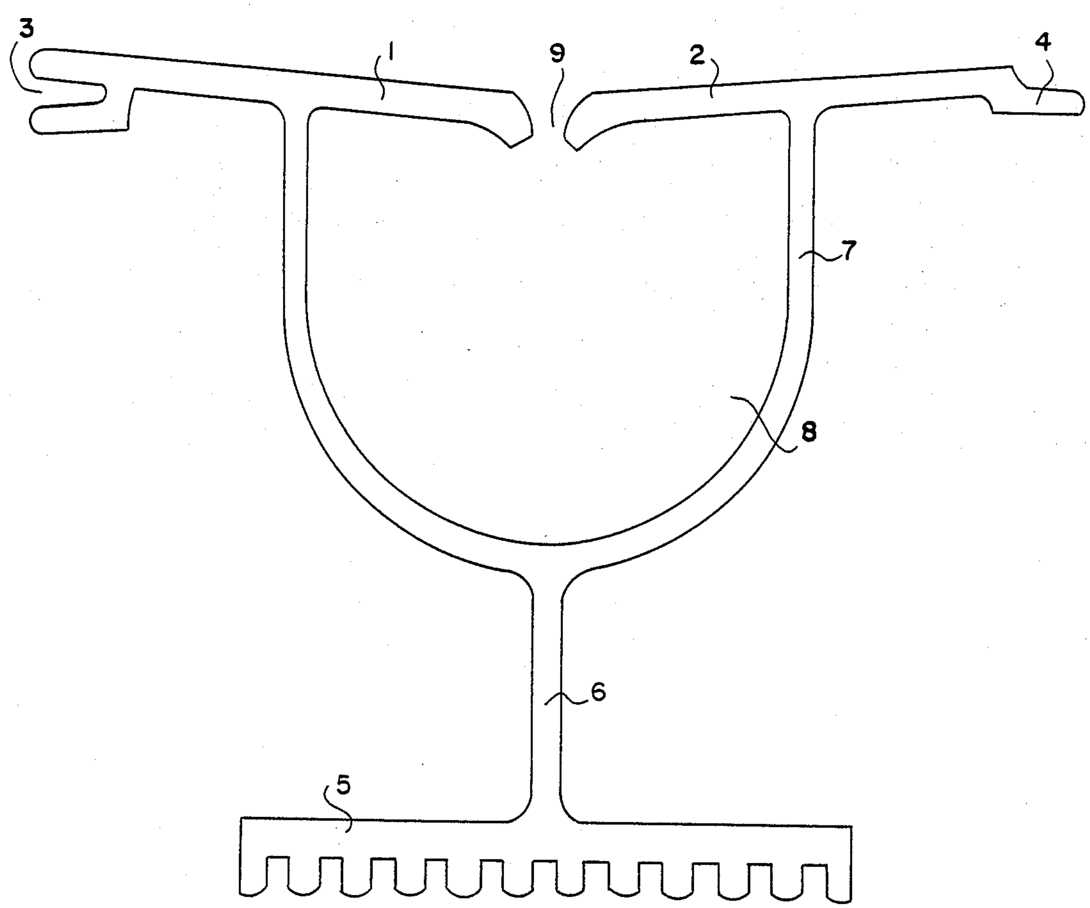
FIG. 1 shows a cross section through a single deck beam according to a preferred embodiment of the present invention, a plurality of such deck beams when connected together forming a landing deck according to the present invention.

The beam shown in FIG. 1, which may appropriately be made by extrusion of metal, comprises two upper flanges 1, 2, a lower flange 5 and a web 6, and two channel walls 7 connect the web and each of the upper flanges 1, 2. Thus, the channel walls 7 define a groove 8, which at the top is open through a slit 9. Along the edges of the upper flanges 1, 2 are shown a slot 3 and a tongue 4, respectively, for joining the corresponding beams.

Figure 2:
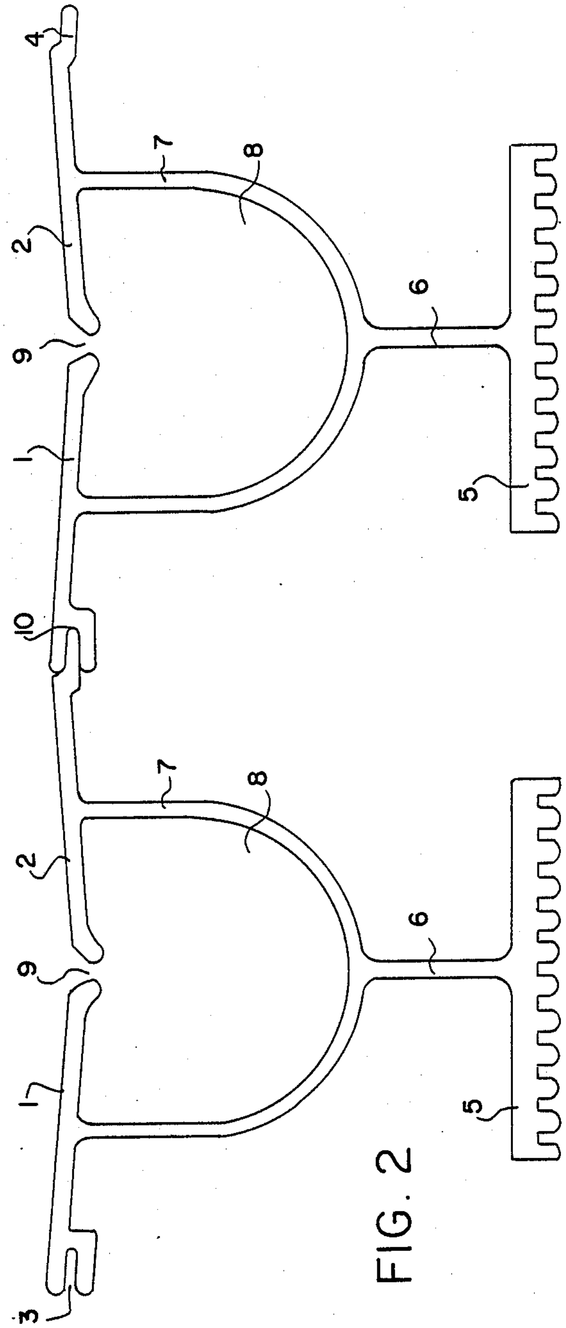
FIG. 2 shows two deck beams as shown in FIG. 1 aligned in parallel and connected together.

Two parallel, interconnected beams are shown in FIG. 2. The tongue 4 of one beam is fitted within the slot 3 of the adjacent beam. A seal means 10 is used to seal the tongue and slot together. A preferred seal means is an adhesive tape which has adhesive on both sides thereof, such that it can be first adhered to the tip of the tongue 4, and then, after removing a protective film from the adhesive on the other side thereof, the tongue 4 can be moved into the slot 3 of the adjacent beam to become sealingly adhered thereto.

As best seen in FIG. 1, the two upper flanges 1, 2 are inclined in the transverse direction, inwardly towards the slit 9. This brings about rapid flow of the liquid on the upper side of the upper flanges towards the slit 9 and therethrough.

The beam shown has a cross section in which the walls 7 defining the groove 8 constitute supporting parts of the cross section. Within the scope of the invention the grooves 8 may of course be formed in more massive beams, and the grooves may have substantially smaller cross sections than the one shown, relative to the main dimensions of the beam.

Additionally, drainage channels may also be provided with grooves for supplying foam for fire extinguishing.

I claim:

1. A landing deck for aircraft which provides enhanced removal of liquids deposited thereon, said landing deck comprising a plurality of parallel drainage beams which are situated in side-by-side relationship to one another, said drainage beams being inclined along their longitudinal dimensions, each of said drainage beams including upper flanges which define a longitudinal slit therebetween and channel walls extending below said upper flanges which form a longitudinal drainage channel below said upper flanges, said longitudinal slit communicating with said longitudinal drainage channel to enable liquid located on said upper flanges to flow through said longitudinal slit and into said longitudinal drainage channel, said longitudinal slit having a narrower width than the maximum width of said longitudinal drainage channel.

2. A landing deck as defined in claim 1, wherein each of said upper flanges are inclined downwardly towards said longitudinal slit therebetween.

3. A landing deck as defined in claim 2, wherein each of the first and second upper flanges includes a free edge remote from said longitudinal slit, and wherein the free edge of one of said upper flanges forms a slot and the free edge of the other of said upper flanges forms a tongue, a tongue of one said drainage beams being insertable in a groove of another of said drainage beams.

4. A landing deck as defined in claim 2, including a seal means between the tongue of each drainage beam and the slot of the adjacent drainage beam in which the tongue fits.

5. A landing deck as defined in claim 4, wherein each seal means comprises a double-sided adhesive tape.

6. A landing deck as defined in claim 1, wherein each said drainage beam includes a lower flange connected to said channel walls.

7. A landing deck as defined in claim 1, wherein each drainage beam is made of steel.

8. A landing deck as defined in claim 1, wherein each drainage beam is made of aluminum.

* * * * *